United States Patent
Hesler et al.

[11] 3,914,680
[45] Oct. 21, 1975

[54] STATIC INVERTER

[75] Inventors: Joseph P. Hesler, Liverpool; Samuel M. Korzekwa, Baldwinsville, both of N.Y.

[73] Assignee: General Electric Company, Syracuse, N.Y.

[22] Filed: Jan. 17, 1975

[21] Appl. No.: 541,867

[52] U.S. Cl............... 321/18; 321/45 R; 331/113 A
[51] Int. Cl.²......................................... H02M 7/48
[58] Field of Search.......... 321/45 R, 18; 331/113 A

[56] References Cited
UNITED STATES PATENTS

| 2,938,129 | 5/1960 | House............................. 331/113 A |
| 2,988,734 | 6/1961 | Samusenko.................. 331/113 A X |
| 3,221,270 | 11/1965 | Tillman et al.................... 331/113 A |
| 3,258,719 | 6/1966 | Korkowski et al............... 331/113 A |
| 3,590,362 | 6/1971 | Kakalec .............................. 321/45 R |
| 3,611,330 | 10/1971 | Cacossa ........................ 321/45 R X |
| 3,660,751 | 5/1972 | Bullinga........................ 321/45 R X |
| 3,689,825 | 9/1972 | Mason et al. ..................... 321/45 R |

*Primary Examiner*—William M. Shoop
*Attorney, Agent, or Firm*—Richard V. Lang; Carl W. Baker; Frank L. Neuhauser

[57] ABSTRACT

A static inverter is disclosed for d.c. to a.c. conversion comprising a pair of switching semiconductor devices and a power transformer having primary, secondary and feedback windings associated with a linear magnetic core. A small perforation partitions the core into two localized branches at the same time forming a small magnetic loop encircling the perforation. Both power windings encircle the full core, while the feedback windings are associated with one of the branches. One branch is designed to saturate before the other branch and thus before full core saturation. Saturation of one branch affects the feedback derived in a winding encircling either branch — decreasing the feedback in the winding encircling the saturated branch and increasing the feedback in the winding encircling the branch remaining unsaturated. The arrangement permits cyclical control of the feedback to avoid full core saturation and thus avoids overstressing the switching devices. The feedback windings are typically single turn windings. The introduction of an additional single turn primary winding connected in the primary power circuit creates a virtual current transformer utilizing the small magnetic loop which makes the feedback drive proportional to load current. The arrangement is reliable and economical in its use of materials.

17 Claims, 8 Drawing Figures

STATIC INVERTER

BACKGROUND OF THE INVENTION

1. Field of the Invention

The present invention relates to static inverters by which electrical energy in the d.c. form is converted to electrical energy in the a.c. form through non-moving or static means. The present invention falls into the class of inverters in which a d.c. source is used to produce current through a pair of alternately switched semiconductor devices connected in series with the primary windings of a power transformer and producing an a.c. output in the transformer secondary.

2. Description of the Prior Art

Static inverters of the class employing a d.c. source, a pair of switching semiconductor devices, and a transformer are in common use. The circuit exists in either the free running or the driven form. In the free running form, feedback windings provide positive feedback necessary for oscillation. The inverter, once started will oscillate with alternate conduction of the power transistors and the reversal in current in the primary windings will produce an alternating voltage in the output winding. Because of the regenerative switching action, square wave voltages appear across all coupled windings in accordance with their turns ratio. In the feedback drive circuit, the base drive is normally limited by a serially connected resistor. The converter will switch from one direction of conduction to the other when the collector current demand on the output circuit due to magnetizing current plus reflected load current exceeds the collector current that can be sustained by the resistance limited base current drive. For a fixed load, the switching occurs when the core saturates, the primary impedance falls, and the magnetizing current starts to rise. The amount of core saturation will change under variable load conditions since the ratio of magnetizing current to reflected load current changes. In high power converters using power transistors, the transistors must have high sustained collector to emitter voltage ratings as well as a high current handling capacity. Typical values are 1000 volts and 5 to 10 amperes. The high voltage transistors must be frabricated with high purity semiconductor material to obtain a high voltage rating and this results in transistors that exhibit long storage times. Shorter storage times can be achieved by doping the active region but this reduces the voltage rating. At the moment of commutation, the storage time delays the actual transistor turn off from that commanded by the base drive due. The result is that very large instantaneous current spikes can be generated that will result in transistor failure if the core is heavily saturated. Prior solutions of this problem have been to avoid the free running circuit altogether and use an external drive or synchronizing signal to switch the converter before core saturation takes place. The solution is a partial one, however, since it is ineffective during the start up periods when the initial core flux state is not in the reverse saturation state characteristic of the free running condition but rather at or near zero remanence. In such circuits, the on time of the first transistor conduction period at start up is increased by the storage time required to "charge" the interelectrode region, and the non-reverse remanent state places an increased magnetizing current demand upon the transistors. These two effects combine with the reflected load current to place very severe initial stresses on the transistors.

While several proposals have been made to mitigate these problems, as by employing an external drive adjusted during start up to shorten the initial conduction periods, the most conventional solution has been to overdesign the transistors and the transformers beyond the requirements of a normal running condition to fit the start up requirements. In free running inverters, which tend to be intrinsically simpler, and which by definition rule out the special start up controls, the most practical solution has been to use overdesigned components.

Assuming that a given transistor has been selected having preassigned storage times and given voltage and current capabilities, applicants have sough to produce a converter wherein both the cyclical and starting stresses on the transistors associated with core saturation have been reduced to a minimum consistent with a given average power level and a given requirement of core and copper material.

SUMMARY OF THE INVENTION

Accordingly, it is an object of the present invention to provide an improved static inverter.

It is another object of the invention to provide an improved static inverter of the free running variety.

It is still another object of the invention to provide an improved static inverter wherein stressing of the transistors is reduced in an economic design using a minimum of materials.

It is a further object of the present invention to provide an improved static inverter wherein full core saturation with its increased stress on the associated switching semiconductor devices is avoided.

It is another object of the invention to provide an improved free running static inverter wherein full core saturation with its increased stress on the associated switching semiconductor devices is avoided.

It is still another object of the present invention to provide an improved free running static inverter wherein full core saturation with its resulting increased stress on the associated switching devices is avoided and wherein the feedback drive is made proportional to the load current.

These and other objects of the invention are achieved in a novel static inverter comprising a pair of semiconductor power switching devices, and a power transformer having a core with which primary, secondary and feedback windings are associated. The core is of a substantially linear magnetic material having a closed magnetic path of approximately uniform cross-section with a small aperture introduced into the core to form two localized branches between which the flux may be steered with a magneto-motive force. A pair of primary power windings and a secondary power winding are provided encircling the full core cross-section. Each primary is coupled between an output electrode of one of the semiconductor devices and a source of d.c. bias potentials for generating an alternating flux as the devices are switched to produce an alternating voltage output in the secondary winding. A first feedback winding provides self-regenerative feedback and cross-coupling to facilitate commutation and a second feedback winding provides self-degenerative feedback. At least one of the feedback windings is coupled through the aperture to one branch of the core to make the feedback dependent upon saturation of a partitioned branch.

In one form of the invention, the degenerative feedback winding encircles one of the branches and a low resistance is provided shunting the degenerative feedback winding to induce a counter magneto-motive force to delay magnetization of the "one" branch until saturation of the other branch but before full core saturation. The increased degeneration offsets the positive feedback and precludes full core saturation so as to limit the maximum current demand on the switching semiconductor devices. The degeneration is applied through a pair of degenerative control transistors whose output electrodes shunt the input electrodes of a switching device for degenerative control. Normally, the magnetic structure of the degenerative branch is selected to make it less readily saturated than the other.

In another form of the invention, the degenerative winding encircles one branch and the regenerative feedback winding means encircles the "other" branch. In this form, the regeneration decreases and degeneration increases as the other branch saturates. The net effect is to avoid full core saturation and limit the maximum current demands on the switching transistors. The degeneration may act either directly on the switching transistors or through a pair of degenerative control transistors.

In a further form of the invention, a pair of auxiliary primary windings of a few turns appropriate for current transformation are provided encircling the other branch. Each auxiliary winding is connected in series with one of the primary power windings and is wound in the same sense as the primary winding in series with it. Typically, both feedback windings are of one or two turns appropriate for current transformation. The auxiliary windings thus provide both a load current responsive feedback drive to the switching transistors and generate a differential magneto-motive force diverting flux into the other branch in the manner of the degenerative winding shunt of an earlier form.

In a last form of the invention, a pair of regenerative control transistors are provided whose input junctions are respectively connected in forward and reverse polarity in a loop with the regenerative winding. The summed forward and reverse junction voltage drops form a constant voltage load establishing a flux rate independent of inverter loading and insuring prior saturation of the other branch even when the loading is light. This provision also acts to stabilize the oscillation frequency of the inverter against inverter loading.

In each form, the degenerative winding is commutated by a pair of diodes coupled between the ends of the degenerative winding and the emitter common of the associated semiconductor devices. In each form, a pair of diodes are used in circuit with the regenerative winding to perform either a commutating or a blocking function.

In the last form of the invention, an additional pair of diodes are provided, connected in the primary power circuit to block negative collector current. A second additional pair of diodes provide an alternate path around the auxiliary primary winding and the switching transistors for any current blocked by one of the "additional" blocking diodes.

Each embodiment may be readily controlled to start and stop oscillating while in a ready condition by the provision of an operating control winding of a few turns encircling the other or regenerative branch of the core. An a.c. coupled turn-on transistor is provided for injecting a transient into the operating control winding to pulse the magnetic path encircling the perforation and start the inverter. A d.c. coupled turn-off transistor provides a load shunting the operating control winding to prevent inverter oscillation when it conducts. When starting is desired, the turn-off transistor is turned off for a controlled operating period commencing with the starting transient.

BRIEF DESCRIPTION OF THE DRAWING

The novel and distinctive features of the invention are set forth in the claims appended to the present application. The invention itself, however, together with further objects and advantages thereof may best be understood by reference to the following description and the accompanying drawings in which:

DESCRIPTION OF A PREFERRED EMBODIMENT

Figure 1:
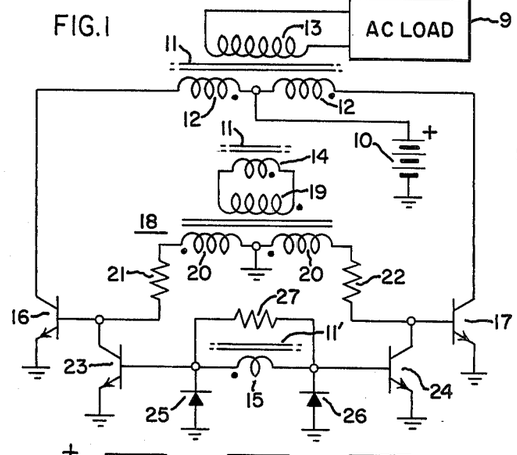
FIG. 1 is an electrical circuit diagram of a static inverter in accordance with the invention wherein the main power transformer includes a degenerative winding associated with a branch of the core to facilitate transistor switching prior to full core saturation.

FIG. 1 illustrates a static inverter forming a first embodiment of the invention. The diagram is a simplified schematic diagram of the invention showing an oscillation circuit for the inverter but omitting the means for initiating or terminating oscillations. These details are provided to the embodiment illustrated in FIG. 5.

The static inverter utilizes an oscillation circuit as a "chopper" for performing the inversion from d.c. to a.c. Inversion from d.c. to a.c. permits an output voltage to be transformed to a higher or lower value as required for the intended application and permits the introduction of controls (by means not shown) responding to variations in supply line voltage or variations in load demand. The a.c. output may be used in a.c. form, or rectified to convert it back to d.c. In performing the inversion from d.c. to a.c., a major interest of the present invention is to do so with an economy of design.

The static inverter of FIG. 1 comprises a power transformer having a core 11 upon which a center tapped primary winding 12 and secondary windings 13, 14 and 15 are wound; a pair of power switching transistors 16 and 17; a separate step down feedback transformer 18 having a primary 19 and a center tapped secondary 20; a pair of current limiting resistances 21, 22; a pair of control transistors 23, 24, a pair of commutating diodes 25, 26; and a low valued resistance 27. The inverter may be regarded as having a control circuit and a power circuit. The power circuit will be discussed first.

The power circuit which comprises the switching transistors 16, 17, and the primary (12) and secondary (13) windings of the power transformer furnishes power from the d.c. source 10 to the a.c. load 9. The transistors 16, 17 each have base, emitter and collector electrodes. Both emitters are grounded. One collector (transistor 16) is connected to an undotted end terminal of the primary winding 12 and the other collector (transistor 17) is connected to the dotted end terminal of winding 12. The center tap of the primary winding 12 is connected to the positive terminal of the d.c. bias source 10. The source 10 is grounded. Assuming that transistors 16 and 17 are controlled to be alternately conducting, a path for current is alternately completed through the two halves of the primary winding to the positive source 10, thus causing alternating flux in the core 11. The core 11, shown in FIG. 2, iis of a substantially linear magnetic material having a closed magnetic path. The core is ideally a continuous toroid, but in practice may be formed of either a fired "soft" ferrite material sectioned and reassembled to have a minimum air gap, or formed from soft iron stampings or tape assembled in a loop. (For control purposes, a small aperture 31 is introduced into the core to cause a localized division of the magnetic path into two branches.) In response to the alternating flux in the core 11, an alternating output voltage is developed in the secondary winding 13. That alternating output voltage is coupled to the a.c. load 9.

The control circuit is responsible for controlled alternate conduction of the transistors 16 and 17. The control circuit acts in response to the flux conditions in the core 11 and applies a control to the bases of switching transistors 16 and 17. In performing that control, it provides regeneration, cross coupling and degeneration for the oscillation circuit.

Regeneration and cross coupling is provided by the regenerative secondary winding 14 of the power transformer, step down feedback transformer 18 and resistances 21 and 22. The primary winding 19 of transformer 18 is coupled to the winding 14 of the power transformer. The secondary winding 20 of the step down transformer 18 is center tapped and grounded at the center tap. One ungrounded end of the secondary winding 20 is coupled through a small current limiting resistance 21 to the base of transistor 16, while the other end of the secondary winding is coupled through a second current limiting resistance 22 to the base of the transistor 17. The secondary winding halves are poled in the same direction. When transistor 16 is conducting, winding 14 (assuming that the main core 11 is in the linear region) and step down transformer 18 couple a self-regenerative feedback to its base tending to further increase its collector current. Winding 14 also applies a potential to the base of the other transistor 17, as required for proper cross coupling, tending to further turn the other transistor (17) off.

The regenerative and cross coupling action described above tends to weaken as core saturation approaches and core saturation aids in bringing about current reversal in the inverter. Core saturation reduces the impedance of the winding forming the collector loop, creating a large demand for increased collector current. Large increases in collector current, in turn, occasion a reduction in current gain in the transistor. As core saturation approaches consequently accompanied by some reduction in transistor gain, the self-regenerative feedback applied to the base of transistor 16 is reduced, tending to cause an initial reduction in collector current. A reduction also occurs in the inhibiting potential applied to the base of the other switching transistor 17, tending to allow it to begin to turn on. the reduction in collector current in 16 initiates a general collapse of the magnetic field in the main flux path. The collapse of the magnetic field, in which substantial energy is stored, generates a reversal in the control potentials derived from winding 14 and transformer 18 and applied to the bases of the two switching transistors 16, 17. Thus, as the magnetic field collapses, the potential to the base of the previously non-conducting transistor 17 is now reversed and tends to turn it on, while that applied to the base of previously conducting transistor 16 now tends to turn it off. The foregoing regenerative and cross coupling actions tend to require full saturation of the core and to demand very high transistor current before current reversal can place. Those tendencies are modified in the present embodiment by a separate negative feedback circuit which tends to cause a flux reversal prior to full core saturation and before high transistor current is "demanded".

The degenerative portion of the control circuit comprises the degenerative feedback winding 15 of the main power transformer, the commutating diodes 25 and 26, resistance 27, and control transistors 23 and 24.

The degenerative circuit is connected as follows. The degenerative feedback winding 15 has one terminal connected to the cathode of the commutating diode 25 and to the base of the control transistor 23. The emitter of control transistor 23 is grounded and its collector is connected to the base of the main switching transistor 16. The other terminal of the degenerative winding 15 is connected to the cathode of a second commutating diode 26 and to the base of a second control transistor 24. The anodes of both commutating diodes (25, 26) are grounded. The emitter of transistor 23 is grounded and its collector is connected to the base of the switching transistor 17. The commutating diode 25 is poled to allow degenerative feedback currents of one sense to flow into control transistor 24, and commutating diode 26 is poled to allow degenerative feedback currents of opposite sense to flow into control transistor 25. A low valued resistance 27 shunts the winding 15 and for reasons that will be explained, permits relatively large currents to circulate in the winding.

Figure 2:
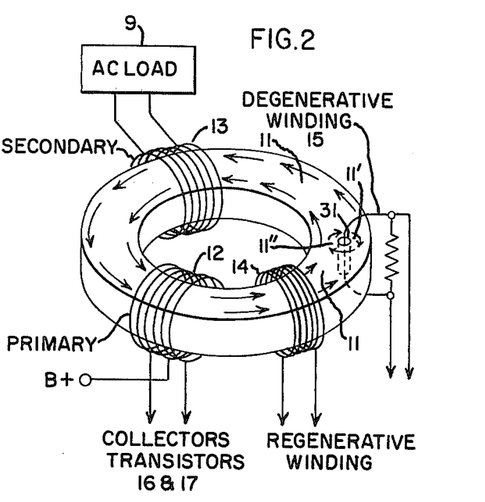
FIG. 2 is a mechanical drawing of the first embodiment showing the disposition of the windings on the core of the power transformer and the partitioning of the core in respect to the degenerative winding.

The degenerative winding 15 is arranged to initiate flux reversal piror to full core saturation and thus prevent excessive current in the switching transistors. The structure of the winding giving rise to this operation is illustrated in FIG. 2. The degenerative winding may be seen to consist of a single turn passing through the perforation 31 in the core 11. The perforation creates two branches (11' and 11") in the magnetic path. The winding 11 links the outer branch (11'). The perforation 31 is oriented perpendicular to the plane of the core and spaced an arbitrary distance between the outer and inner diameter of the core. Assuming a continuous magnetic material, typically a toroid, new elemental rings of constant radius will tend to saturate for each increase in the level of magnetization. Successive rings will tend to saturate successively, starting at the inner surface of the core with rings of least radii (those most easily magnetized because they have the shortest paths) and continuing to the outer surface of the core with rings of successively larger radii and less easily magnetized longer paths. Those rings at a radius less than that at the perforation 31 will tend to saturate before those at a radius greater than that at the perforation. Since saturation precludes core-linked transformer action, a winding linking one branch, i.e., the inner branch, could be used to detect partial saturation before the core is fully saturated (but is not in the first embodiment). If the winding linking the outer branch is substantially short circuited, it may be used to generate a counter magneto-motive force, tending to delay the saturation of the outer elements of the core even more than the amount attributable to the geometry of the core.

As suggested above, the shunted degenerative winding delays the magnetization of the outer elemental rings of the core. In so doing, the degenerative action upon the switching transistors is deferred until well up the magnetization curve of the core but substantially before full core saturation and the resultant high current demand on the switching transistors take place.

The "further" delay in magnetization of the outer branch of the core and the pre-saturation switching of the core by the winding 15 may be explained by further reference to FIG. 2. As seen in FIG. 2, the single turn winding 15 encircles the outer branch (11') of the magnetic path and is shunted by resistance 27. Since resistance 27 is small, relatively high currents can circulate in the winding. These currents generate a magneto-motive force generating a flux in the encircled outer branch in a sense to oppose the main flux. The return path for this flux closes around the perforation 31 in a small loop. In the inner branch 11' of the magnetic path, the flux due to the shunted turn is in the same sense as the main flux. So long as the outer flux path 11 is unsaturated and free to develop a counter MMF, any growth of flux in the outer flux path of the core is impeded (but not prevented). Under these conditions, the voltage in the degenerative winding 15 is kept small enough to have a negligible effect upon the conduction of control transistors 23, 24. After the inner flux path 11" saturates, flux is forced to enter the outer flux path (11') causing a step up in the voltage induced in the degenerative winding 15 and a change in conduction in the control transistors. Assuming that transistor 16 is conducting, the increased voltage now induced in degenerative winding 15, acting in a path completed by the commutating diode 26, tends to turn on the control transistor 23. Conduction by control transistor 23 reduces the voltage across the input junction of switching transistor 16 and reduces its output current. This reduction in output current initiates the collapse of the magnetic flux in the core and in turn re-institutes a reversal of the control potentials to the other half of the circuit. Thus, switching transistor 17 is now turned on and its current causes a reversal of the flux in the core. As noted, this switching is arranged to take place prior to full core saturation and thus avoids the high current demand placed on the switching transistors should full core saturation occur.

Figure 1A:
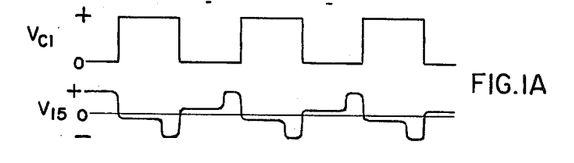
FIG. 1A illustrates two waveforms useful in explaining the operation of the FIG. 1 embodiment.

In the embodiment of FIG. 1, the degenerative winding 15 causes current switching after partial core saturation but before full core saturation. Two waveforms relevant to operation of the first embodiment are illustrated in FIG. 1A. The upper waveform of FIG. 1A is the output potential (VC1) at the collector of one switching transistor. A similar waveform, but out of phase with the illustrated one, appears at the collector of the other switching transistor. In operation, the power transistors operate like switches, being either on or off. The collector voltage is accordingly either at a maximum value near that of the bias supply or at a minimum value near ground potential. A graph of the voltage (V15) in a single turn degenerative winding is illustrated below the waveform of the collector potential. As illustrated, the degenerative potential alternates in polarity in successive half-cycles so that it may be used for alternately controlling each half of the inverter. As previously noted, from the beginning of each half-cycle until saturation of the inner branch 11", the voltage induced in the degenerative winding is small. When the inner branch of the core saturates, however, to initiate the end of the cycle, the degenerative voltage increases sharply causing switching to occur before large currents are demanded of the switching transistors. In the FIG. 1 embodiment, the regenerative feedback is not graphed since it continues generally undiminished by saturation effects.

Figure 3:
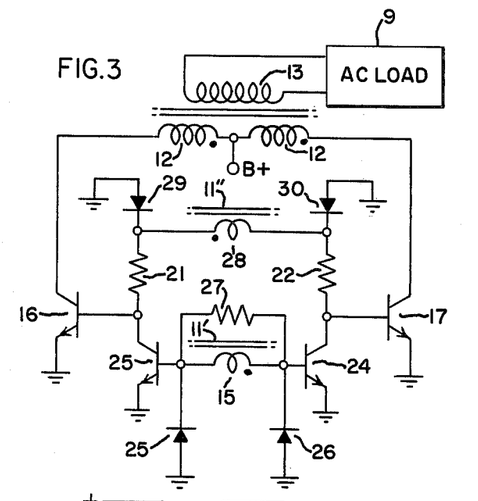
FIG. 3 is a circuit diagram of a second embodiment of the invention wherein both the regenerative and degenerative windings are associated with branches of the partioned core.

The same principles used in the FIG. 1 embodiment are used and supplemented in FIG. 3. In the FIG. 3 embodiment, after partial core saturation, the regenerative feedback is reduced when the degenerative feedback is increased. The FIG. 3 embodiment will now be considered.

In FIG. 3, the feedback winding 14 and the separate feedback transformer 18 of FIG. 1 are replaced by a second winding 28 passing through the perforation 31 and embracing the inner branch 11" of the magnetic path. In the FIG. 3 embodiment, the primary and secondary power circuits are as in FIG. 1 and bear similar reference numerals. The degenerative control circuit (involving control transistors 23, 24, the degenerative winding 15, commutating diodes 25, 26 and low impedance load 27) are also as in FIG. 1.

In FIG. 3, the winding 28 provides the regenerative and the cross coupling functions. In particular, the dotted terminal of the winding 28 is coupled through current limiting resistance 21 to the base of switching transistor 16, while the undotted terminal of winding 28 is connected through a similar current limiting resistance 22 to the base of switching transistor 17. (The polarity of the regenerative and cross coupling winding 28 is opposite to that in the degenerative winding 15.) Commutating diodes 29 and 30 respectively have their cathodes grounded and their anodes coupled to the respective ends of the regenerative winding 28. The regenerative current into the base of switching transistor 16 thus flows through commutating diode 30, and that into the base of transistor 17 flows through commutating diode 29.

The regenerative and cross coupling action of winding 28 is modified by its structure to act strongly during the initial portion of core magnetization but to weaken during the latter portion of core magnetization. This effect is brought about by the construction illustrated in FIG. 2. The winding 28 is also a single turn passing through the perforation 31 in the core and embracing the inner path (11″) of the core. During the initial portion of core magnetization, regeneration and cross coupling resulting from this winding is in full effect. At an intermediate point, however, the inner branch saturates and both the regeneration and cross coupling weakens. At the same time, degeneration is increased by winding 15 with the overflow of the flux into the outer branch 11‴. From this point on the degenerative effect takes over and the transistors are switched prior to full saturation of the core.

Figure 3A:
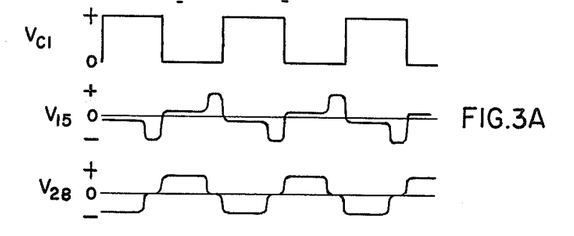
FIG. 3A is a graph of three principal waveforms useful in explaining the operation of the FIG. 3 embodiment.

Three waveforms relevant to the operation of the FIG. 3 embodiment are shown in FIG. 3A. The first (and upper) waveform is the collector potential (VCI) of one of the switching transistors. The second waveform is the degenerative potential (V15) arising in the winding 15. The third waveform is the regenerative potential (V28) arising in the winding 28. The collector potential and the degenerative potential in the FIG. 3 embodiment are the same as in the FIG. 1 embodiment. The regenerative potential however is different. It is of alternating polarity in successive half-cycles. In each half-cycle it quickly rises to a full value and then before the end of the half-cycle it falls to near zero. The fall in a regenerative potential (V28) occurs at the same time as the rise in the degenerative potential (V15).

Figure 4:
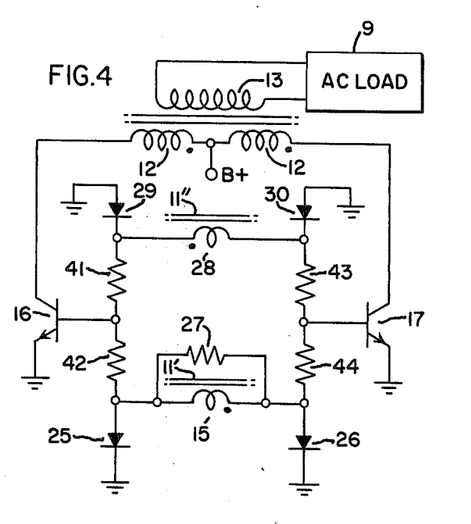
FIG. 4 is an illustration of a third embodiment of the invention wherein the degenerative and regenerative control potentials are applied directly to the switching transistors and an intermediate pair of control transistors are not required.

In the FIG. 4 embodiment of the invention the intermediate control transistors 23 and 24 are eliminated and the regenerative winding 15 is coupled directly into the base circuit of the switching transistors 16 and 17. The regenerative connections are as in FIG. 3 with resistances 41 and 43 being substitutes for 21 and 22 of FIG. 3. The degenerative winding is shunted by the resistance 27. The undotted terminal of 15 is coupled through a load current limiting resistance 42 to the base of transistor 16 and a dotted terminal of the winding 15 is coupled through a current limiting resistance 44 to the base of switching transistor 17. The commutating diodes 25 and 26 are connected as before. In the operation of the FIG. 4 embodiment, the regenerative action is shortened as in FIG. 3. With saturation of the inner branch of the core, the regenerative and cross-coupling from winding 28 terminates prior to the end of the half-cycle and the degenerative action of winding 15 takes over. As in the FIG. 3 embodiment, saturation of the inner branch (11″), used for the regenerative and cross-coupling action, brings about a reduction in regeneration at the same time that the degeneration is increased. This prevents the two feedback effects from working in opposition.

Figure 5:
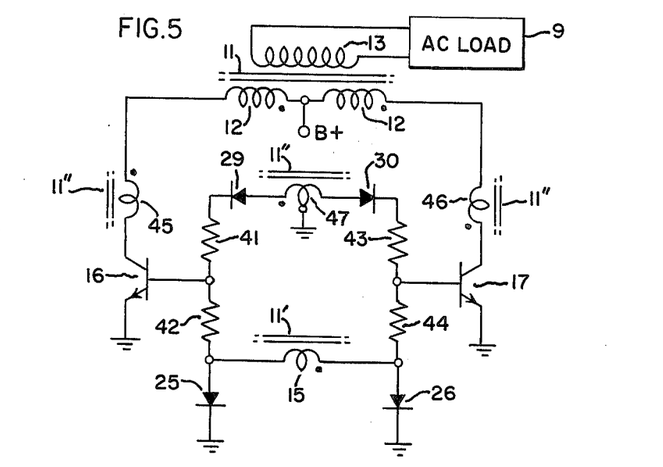
FIG. 5 is an electrical circuit diagram of a fourth embodiment of the invention wherein additional windings are provided associated with each switching transistor to provide a composite voltage transformer-current transformer action so as to make the output more directly responsive to output load requirements.

A fourth embodiment of the invention is shown in FIG. 5. In this embodiment an additional winding (45, 46) is provided in the collector paths of each of the switching transistors. The degenerative winding 15 is connected between interconnection of the commutating diode 25 and current limiting resistance 42 and the interconnection of commutating diode 26 and current limiting resistance 44 in the base circuit of switching transistors 16 and 17. The low resistance shunt 27 of the prior embodiments is not required in the FIG. 5 embodiment since the additional windings 45, 46 provide the same function. The regenerative winding 47 is now provided as two single turns with the center point being returned to ground. The anodes of commutating diodes 29 and 30 are connected respectively to the dotted and undotted end terminals of the center tapped winding. The cathodes of the diodes 29 and 30 are connected respectively through the current limiting resistances 41 and 43 to the bases of the switching transistors 16 and 17. The additional winding 45 is connected in series between the collector of switching transistors 16 and the undotted terminal of primary winding 12. The additional winding 46 is connected in series between the collector of switching transistor 17 and the dotted terminal of primary winding 12. As illustrated by the dots, the winding 45 associated with transistor 16 is connected in the same polarity as the half of the primary winding associated with transistor 16 and the winding 46 associated with transistor 17 is connected in the same polarity as the half of the primary winding associated with transistor 17. Both windings 45 and 46 are single turns introduced through the perforation 31 to the core and encircling the inner branch of the core. The auxiliary windings 45 and 46 may be regarded as forming the primaries of a current transformer whose core is the region encircling the perforation 31 and whose secondaries are the regenerative and degenerative windings.

The net feedback relations in the FIG. 5 embodiment are thus a composite of the voltage transformation action between the primary winding 12 and feedback windings 47, 15 and the current transformer action between auxiliary windings 45 and 46 and feedback windings 47 and 15. Their composite effect will now be discussed.

The windings 45 and 46 perform three primary functions. As noted above, they are closely coupled to the regenerative and degenerative windings 15 and 47, respectively, and due to current transformer action tend to force the feedback currents into proportionality with the collector current. Thus, when the current demanded by the load is light, the current transformer action causes the feedback currents to be reduced proportionately. This avoids oversaturation of the power transistors when the load is light.

A second function of the windings 45 and 46 is to provide a differential magneto-motive force which confines the flux to the inner more readily saturated cross section of the core during the major portion of the conduction cycle. The magneto-motive force which has the indicated flux steering effect is provided by collector current flowing through the windings. In FIG. 5, the windings 45 and 46 with collector current flowing perform the same function that the degenerative feedback winding performs with current flowing through shunting resistance 27 in the prior FIGS. 1, 3 and 4.

A third function of windings 45 and 46 is in aiding commutation. In the current transformer, energy is stored in the magnetic field in the region of the perforation 31. Accordingly, when the collector current in one transistor begins to fall, the current transformer field begins to collapse. Since both regenerative and degenerative feedback windings are used reversibly, the feedback windings absorb energy from the collapsing magnetic field and by now generating reversed potentials aid in turning on the other transistor and in turning off the initial.

Figure 6:
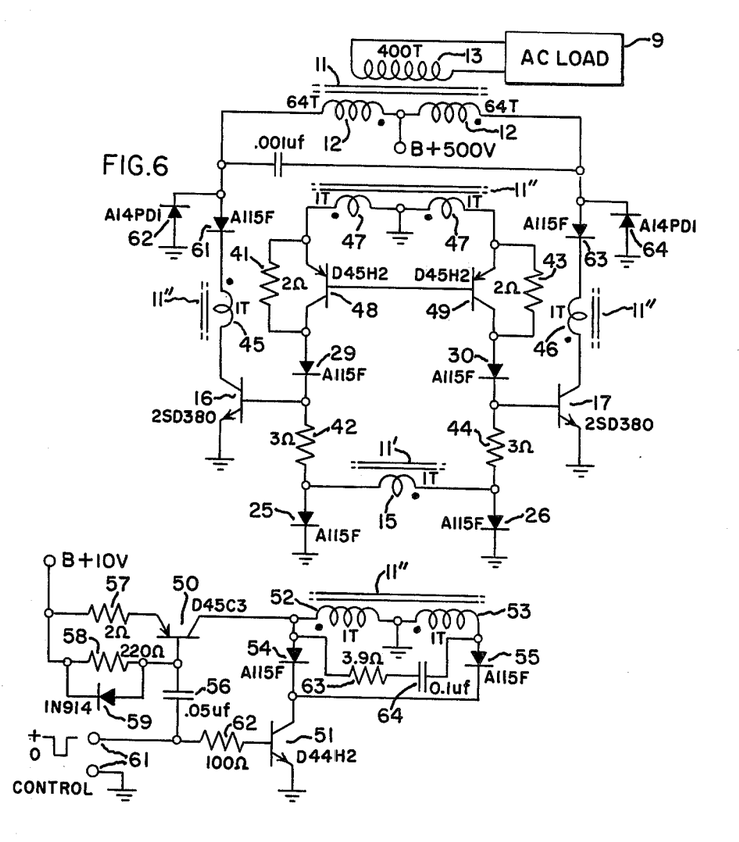
FIG. 6 is a circuit diagram of a fifth embodiment of the invention wherein control transistors are reinstituted in the regenerative and cross coupling windings. In the FIG. 6 embodiment circuit values and the control circuitry are provided.

A more completely detailed embodiment of the invention is illustrated in FIG. 6. The drawing includes transformer details, component values, and semiconductor types. The regenerative and degenerative windings (47, 15) are as illustrated in FIG. 5, but a pair of control transistors 48 and 49 are introduced in circuit with the regenerative windings 47 in a circuit designed to insure that the inner branch (11″) saturates first under all conditions of load. The bases of the two control transistors (48 and 49) are joined while their emitters are coupled respectively to the dotted and undotted ends of regenerative windings 47. A small 2 ohm resistance (41 and 43) shunts each transistor. The collector of transistor 48 is coupled through diode 29 to the base of switching transistor 16. The collector of transistor 49 is coupled through diode 30 to the base of switching transistor 17.

The control circuit associated with the regenerative winding is modified to provide better control of the flux switching rate of the inner or regenerative branch of the core. The transistors 48 and 49 are selected to have equal reverse emitter base breakdown voltages. The load seen by the two regenerative feedback windings is thus equal to the sum of the forward and the reverse base emitter voltage drops of the two transistors. If the two transistors are alike, the load on the regenerative winding is independent of which transistor is conducting. This circuit arrangement makes the current in the regenerative winding essentially dependent on the total primary winding currents. The rate of saturation of the inner or positive regenerative branch of the core as a result of this load on the regenerative winding is held essentially constant and independent of circuit load variations. In practice, this insures that the inner branch will saturate first under all load conditions and to stabilize the oscillation frequency of the inverter against load or supply variations.

The two ohm resistances 41 and 43 provide an alternate path for initial regenerative feedback current during the commutating interval when there is insufficient voltage developed across the regenerative windings (47—47) to cause current flow through the junctions.

The diodes 29 and 30 are positioned to block any circulating current through the regenerative feedback windings 47, 47, resistances 41–44 and the degenerative winding 15, such as would detract from the control applied to the switching transistors.

Four diodes 61–64 are inserted in the primary power circuit to facilitate commutation and for protection of the switching transistors. Diodes 61 and 63 are connected respectively between one half of the primary winding 12 and auxiliary primary winding 45, and between the other half of the primary winding 12 and auxiliary primary winding 46. Diodes 61 and 63 are poled to permit normal collector current flow and to block any inverse current flow through the auxiliary primary windings or into the collectors. Such inverse current may arise from leakage reactance or from the collapsing flux field under light load conditions. Cores with air gaps normally have a large leakage reactance giving rise to this problem. The blocking diodes thus prevent a negative collector current from flowing in the auxiliary primary winding where it would tend to generate a current in the regenerative and cross-coupling windings opposing commutation. The diodes 62 and 63 are protective diodes precluding the application of large inverse voltages to the switching transistors 16 and 17. They provide an alternate path to the common terminal for the negative collector currents by passing both the auxiliary primary winding and the power transistors.

The starting or control circuit illustrated in FIG. 6 is designed to start and stop the inverter in response to a control pulse once the inverter is powered and in a ready condition. As previously noted, the oscillatory circuit is not self-starting and requires a control circuit for starting the oscillations and for discontinuing the oscillations. Connection and disconnection of the bias supply can also be employed with a built-in starting provision, if closer timing control is not needed. The illustrated control circuit is designed to be turned on and off at a 400 cycle rate with variable duty cycles. The inverter may be held in the ready condition for an indeterminate period.

The control circuit is illustrated at the lower portion of FIG. 6. It exerts its control action through a pair of (typically) single turn windings 52 and 53 associated with the inner or regenerative branch (11″) of the core. The control circuit also includes transistors 50, 51, diodes 54, 55 and 59, and resistances 57, 58, 62, 63, and capacitances 56 and 64. The input terminals 61 of the control circuit are designed to accept a negative-going pulse which goes from a positive value to zero, holds at zero for a short period for operation, and then returns to its positive value when the signal output is to be terminated. The input terminals 61 are coupled through capacitor 56 to the base of "turn-on" PNP transistor 50 and through resistance 62 to the base of "turn-off" NPN transistor 51. The base of PNP transistor 50 is also coupled through resistance 58 shunted by forwardly-poled diode 59 to a positive bias source. The emitter of transistor 50 is coupled through resistance 57 to the positive bias source. The collector of transistor 50 is connected to the dotted terminal of the turn-on winding 52 whose undotted terminal is grounded. The negative-going transient coupled through capacitor 56 causes transistor 50 to be conductive momentarily causing a current in the winding 52, which is associated with the regenerative branch 11″ of the core and which tends to start the circuit oscillating. Because of the capacitive coupling by capacitor 56 to transistor 50, the output pulse is based only on the transient of the control signal.

Oscillation will not start in response to the pulse from transistor 50 until transistor 51 is turned off. At the same time that the transistor 50 is momentarily turned on, the control signal is direct coupled through resistance 62 to the base of NPN transistor 51 to turn it off. The emitter of transistor 51 is grounded and its collector is coupled through forwardly poled diode 54 to the dotted terminal of winding 52 and through forwardly poled diode 55 to the undotted terminal of winding 53. The control signal turns off the transistor 51 during the operating intervals. When the transistor 51 is conductive, both control windings 52 and 53 are effectively short-circuited by transistor 51, which is normally conducting. This loads the oscillation circuit preventing oscillation. Accordingly, the control signl which turns on PNP transistor 50 turns off NPN transistor 51 and the starting pulse causes the circuit to oscillate, unimpeded by transistor 51. When the control pulse is over, transistor 51 reverts to its normally "on" condition and turns off the circuit. Since it is coupled to windings in both phases, the turn off circuit operates on either half cycle of oscillation.

The control circuit illustrated in FIG. 6 is designed for rapid and precisely timed "pulses" of output power. If ON-OFF control for the inverter is sought without regard to precision in timing or with regard to initial polarity, a much simpler control circuit may be used. For instance, in the FIG. 5 embodiment one may connect the ground connections of the degenerative winding 47 and the cathodes of diodes 25 and 26 to the cathode of a starting diode whose anode is grounded and which is shunted by a small capacitor (0.1 microfarad). If the circuit is charged through a small isolating resistance by a low positive d.c. bias, the circuit voltage (at the cathode of the starting diode) will climb to perhaps 2 or 3 volts of positive potential, at which point one or the other of the switching transistors (16 or 17) will be forced to conduct and the circuit will start to oscillate. When one of the switching transistors conducts, the potential at the cathode of the starting diode will be drawn to a negative value (typically −0.7 volts). If it is desired that the circuit always start with one polarity, the base of one of the switching transistors (16 or 17) may be connected momentarily to a source of positive bias through a similar capacitively shunted, normally reversely biased diode.

The inventive technique of sensing saturation in the branch of the core prior to full saturation allows the maximum utilization of main core flux density excursions in a free running static inverter. It avoids the saturation effects and the resultant high magnetization current demands on the switching transistors that such supplies normally suffer from. This can be translated into a combination of less core material or less windings for material savings and allows operation of the semiconductor switches at higher average current ratings. The feature also protects against undesirable starting magnetization current transients associated with core saturation.

The waveform illustrated in FIGS. 1A and 3A depict the running condition of the circuit with primary emphasis on the altered feedback relationships as branch saturation occurs. The waveforms do not depict the variable shortening of the initial conduction period which is significant in reducing starting stresses in the switching transistors. In starting, the initial conduction period is shorter than the others because the initial remanent condition will not be reversely magnetized, as is characteristic of the running condition, but rather at some intermediate magnetization, usually near zero remanence. Thus, the initial magnetizing current supplied by the switching transistors is only required to drive the core from near zero magnetization to the final magnetization state rather than from full reverse magnetization to the final forward magnetized state. Since the feedback windings "sense" imminent core saturation and adjust the current demanded of the switching transistors to stop short of full core saturation, the initial conduction period is shortened according to need and a hard drive into saturation is avoided. This mode of operation thus insures against stressing the transistors in both starting as well as in the normal running condition.

The transformer selected for the FIG. 6 embodiment is designed to operate with a 500 V d.c. supply and to produce a 3 KV a.c. output voltage at a frequency in the 10–30 KHz region. The transformer core is of a soft ferrite of one inch by one inch cross section having an inner area of two inches by 2 ½ inches. The ferrite core is a material used in television flyback transformers. A suitable material is Ferrox Cube 3C5. To facilitate assembly, the core is split in the middle of the long leg in the form of "C" cores and reassembled with the multiturn windings on one leg. Suitable C cores are Ferrox Cube, catalog number 1F5U. The inner area is made large to accommodate the windings and to minimize the problem of insulation in the event that the secondary winding is maintained at a large d.c. potential with respect to ground. The perforation for the current transformer is situated in the short leg. All the current transformer turns are threaded through the perforation 31. These include the regenerative winding 47, the degenerative winding 15, the auxiliary windings 45 and 46 and the start windings 52 and 53 in the FIG. 6 embodiment.

The positioning of the perforation of the core is typically at or beyond the center of the core cross section so that the cross section of the inner regenerative branch is half or larger than half the total core cross section. The partitioning of the core cross section is not critical, but should be accurate for reproducible switching characteristics. Other fixed parameters of the circuit such as the stored charge of the switching transistors and the adjustable parameters such as the biasing of the switching and control transistors and the time constants in the feedback paths, provide means to establish a desired level of maximum core magnetization. The cross section of the degenerative branch in the first three embodiments (i.e., those using a shunted degenerative turn for flux steering) is largely affected by the stored charge effects. For low stored charge and for low frequency operation, the degenerative cross section should be quite small. In the last two embodiments, in which load adjusted feedback is obtained from an auxiliary primary winding and in which the region around the core perforation becomes the core of a current transformer, optimum operation dictates neither branch be substantially smaller than the other.

What is claimed as new and desired to be secured by Letters Patent of the United States is:

1. A static inverter comprising:
   a. input terminals for connection to a source of d.c. potentials,
   b. a pair of semiconductor power switching devices, each semiconductor device having a pair of input electrodes and an output electrode,
   c. a transformer having
      1. a core of substantially linear magnetic material having a closed magnetic path of approximately uniform cross-section with a small aperture introduced into said core to partition the magnetic cross section in a localized region into two branches between which the flux may be steered with a magneto-motive force,
      2. a pair of primary power windings encircling the full core cross-section, each coupled between an output electrode of one of said semiconductor devices and said source terminals for generating an alternating flux in said core as said devices are switched,
      3. a secondary power winding encircling the full core cross-section to derive an alternating voltage output, 4. first feedback winding means associated with said core and coupled to said input electrodes to provide self-regenerative feedback to each semiconductor device and cross-coupling between semiconductor devices to facilitate commutation;

second feedback winding means associated with said core and coupled to said input electrodes to provide self-degenerative feedback to each semiconductor device;

at least one of said feedback winding means being coupled through said aperture to one branch of said core to make the feedback dependent upon saturation of a partitioned branch.

2. A static inverter as set forth in claim 1 wherein
a. said degenerative feedback winding means encircles one of said branches,
b. a low resistance is provided shunting said degenerative feedback winding means to induce a counter magneto-motive force to delay the magnetization of said one branch until saturation of said other branch but before full core saturation, said increasing degeneration offsetting the positive feedback to preclude full core saturation and thereby limit the maximum current demand on said semiconductor devices.

3. A static inverter as set forth in claim 2 wherein a pair of degenerative control transistors are provided each having a base electrode coupled to one of the ends of said degenerative feedback winding means, each of said control transistors being connected in shunt with the input electrode of a switching semiconductor device for degenerative control.

4. A static inverter as set forth in claim 3 wherein said one branch is less readily saturated than the other.

5. A static inverter as set forth in claim 1 wherein
a. said degenerative winding means encircles one of said branches, and
b. said regenerative feedback winding means encircles the other of said branches to terminate the regenerative feedback when said other branch saturates prior to full core saturation, and
c. a low resistance is provided shunting said degenerative feedback winding means to induce a counter magneto-motive force to delay the magnetization of said one branch until saturation of said other branch but before full core saturation, said decreasing regeneration and increasing degeneration precluding full core saturation and thereby limiting the maximum current demand on said semiconductor devices.

6. A static inverter as set forth in claim 1 wherein
a. said regenerative feedback winding means encircles one of said branches,
b. said degenerative feedback winding means encircles the other of said branches, and
c. both of said feedback winding means are of a few turns appropriate for current transformation.

7. A static inverter as set forth in claim 6 wherein a pair of auxiliary primary windings of a few turns appropriate for current transformation are provided encircling said other branch, each auxiliary winding being connected in series with one of said primary power windings between an output electrode of one of said semiconductor devices and said source terminal, each of said auxiliary windings being wound in the same sense as the primary winding in series therewith to generate a differential magneto-motive force diverting flux into said other branch, and to provide load current responsive feedback.

8. A static inverter as set forth in claim 7 wherein said one branch is less readily saturated than said other branch.

9. A static inverter as set forth in claim 7 wherein a pair of regenerative control transistors are provided, each having base, emitter and collector electrodes, the bases thereof being joined, the emitters being coupled to the respective ends of said regenerative winding means, and the collectors thereof being coupled respectively to an input electrode of one of said power switching devices, the serial input junctions of said regenerative control transistors providing a constant voltage load to said regenerative winding to establish a flux rate independent of inverter loading to insure prior saturation of said other branch, and to stabilize the oscillation frequency.

10. A static inverter as set forth in claim 9 wherein said power switching devices are transistors, each having base, emitter and collector electrodes, said emitter electrodes being common; said regenerative feedback, cross coupling and degenerative feedback being applied to said base electrodes.

11. A static inverter as set forth in claim 10 wherein
a. said degenerative winding is coupled between the base electrodes of said switching transistors, and
b. a pair of diodes are provided coupled between the ends of said degenerative winding and said common emitters, poled to provide commutation.

12. A static inverter as set forth in claim 11 wherein a pair of blocking diodes are provided, each connected in series in the forward direction between the collector of one of said regenerative control transistors and the base of one of said switching transistors.

13. A static inverter as set forth in claim 12 wherein a pair of low valued resistances are provided in shunt with said regenerative control transistors to allow current to flow in said degenerative winding for low magneto-motive forces.

14. A static inverter as set forth in claim 13 wherein one additional pair of blocking diodes are provided, each connected in the forward direction between the collector of each switching transistor and one primary power winding and to block negative collector current, and a second additional pair of diodes are provided each coupling a respective winding end to said emitter common to provide an alternate path around said auxiliary primary winding and said switching transistor to any current blocked by diodes of said one additional pair.

15. A static inverter as set forth in claim 14 wherein
a. an operating control winding of a few turns appropriate for current transformer action is provided encircling said other branch of said core, and
b. means are provided for injecting a transient into said operating control winding to magnetize said path encircling said perforation momentarily to start inverter oscillation.

16. A static inverter as set forth in claim 15 wherein a. a turn-off transistor having a base electrode is provided shunting said operating control winding to preclude inverter oscillation when it is conductive, and
b. means are provided for rendering said turn-off transistor non-conductive for a controlled operating period when said starting transient occurs.

17. A static inverter as set forth in claim 16 wherein a. said operating control winding is center tapped, and
b. a pair of diodes are provided connected at the opposite ends thereof in series with said turn-off transistors and poled in the forward direction to permit turn-off during oscillatory swings of either polarity.

* * * * *